United States Patent [19]
Rossi

[11] Patent Number: 5,190,811
[45] Date of Patent: Mar. 2, 1993

[54] ATHLETIC COURT SURFACE

[76] Inventor: Dennis Rossi, 4051 N. Point Rd., Baltimore, Md. 21222

[21] Appl. No.: 901,813

[22] Filed: Jun. 22, 1992

[51] Int. Cl.⁵ .................. B32B 27/40; A63G 1/00; A63H 13/20
[52] U.S. Cl. .................. 428/246; 428/235; 428/251; 428/252; 428/290; 428/302; 428/236; 428/261; 428/285; 273/29 B; 273/31
[58] Field of Search ............ 428/246, 251, 252, 423.7, 428/425.6; 273/29 B, 31

[56] References Cited

U.S. PATENT DOCUMENTS

| | | | |
|---|---|---|---|
| 4,364,331 | 12/1982 | Foenard | 428/86 |
| 4,608,104 | 8/1986 | Holtrop et al. | 428/246 |
| 4,915,999 | 4/1990 | Tillotson | 428/95 |

Primary Examiner—George F. Lesmes
Assistant Examiner—Kathryne E. Shelborne
Attorney, Agent, or Firm—Scott R. Cox

[57] ABSTRACT

An improved athletic court surface comprised of a top surface secured to a backing portion wherein said top surface is comprised of a polyester fabric treated with an acrylic latex emulsion and the backing portion is comprised of a balancing fabric layer secured by a polyurethane foam layer to a stabilizing layer containing fiberglass wherein the backing portion is secured to the top surface by a second polyurethane adhesive layer. This surface has its seams joined and is then secured to the base temporarily or permanently. The surface is then coated with a layer or layers of an acrylic latex of proper texture, pliability, and color, depending on the type of athletic surface involved.

9 Claims, 1 Drawing Sheet

ATHLETIC COURT SURFACE

BACKGROUND OF INVENTION

1. Field of Invention

This invention relates to athletic surfaces. More specifically, it relates to a specially designed cushioned athletic surface.

2. Prior Art

In this era where fitness has become important to Americans, greater use of outdoor and indoor athletic facilities is occurring. Because of the demand for these athletic facilities and because of their increased cost of construction, it is critical that the maintenance costs of such facilities be kept to a minimum.

Early athletic surfaces, particularly tennis court surfaces, were constructed from concrete, asphalt or clay. Each of these surfaces has certain significant deficiencies. Clay surfaces, while soft and easy to play on, are expensive to install and difficult to maintain. Asphalt and concrete are unyielding surfaces which frequently cause injuries. In addition, concrete and asphalt surfaces, when exposed to extremes of heat and cold and to water and ice, frequently crack or split, thus making them less useful and subject to constant repair.

As a result of these deficiencies in the bases most frequently used for athletic activities, artificial cushioned surfaces have been developed. For example, there has been developed an artificial cushioned surface manufactured under the trademark Courtship by TenniSphere, Inc. in Rome, Georgia. This surface is comprised of a polyethylene foam which is glued to a spun-bond, non-woven polyester material. To these joined materials is added an SBR (styrene butadiene rubber) latex coating which is air dried in place. To this surface can be added multiple layers of a conventional acrylic latex mixture with or without sand and various paints to give the surface of the material the feel and touch of a tennis court.

While this artificial surface looks and feels like a tennis surface, it has many significant deficiencies particularly when used in geographic areas with significant year-round changes in temperature. The major deficiency in this surface results from its shrinkage when exposed to external temperatures above about 50° or 60° F. caused at least partially by moisture absorbency. As this surface is exposed to these changes in temperature, it shrinks approximately 0.8% in length and approximately 0.7% in width. This shrinkage frequently results in cracks in the base around the outside of the tennis court ranging in size from about ½" to 2" in width. While there are methods to repair these cracks, such methods are expensive and additional cracks sometimes occur even after the repairs are completed. In addition to the shrinkage problem, this artificial tennis court surface is too soft, thus providing a less useful playing surface. Because of this softness the material wears out quickly requiring replacement in a relatively short period of time. An additional deficiency in this surface is the result of the polyethylene foam and the polyester material being glued together. Under continued use, these surfaces may come apart causing bulges or bubbles in the surface necessitating repairs to the surface. A further deficiency of this surface caused by its softness is disclosed when the material is repaired after being torn. Replacement sections create an area of the surface which will exhibit a considerably different playing feel than the rest of the surface.

A slightly improved process for the production of an artificial athletic surface has also been developed by TenniSphere, Inc. in Rome, Georgia. In this improved process the SBR latex which coats the polyester, is heat dried in place. This reduces slightly the amount of shrinkage of the surface. However, even though the width shrinkage of the material is improved by this process, the length shrinkage is not improved and all of the other deficiencies in the surface still remain, including, specifically, problems associated with moisture absorbance.

Other surfaces for use in athletic activities have been disclosed, for example, in French Patent No. 2,439,084, *Eram Industries*, U.S. equivalent, U.S. Pat. No. 4,337,292, U.S. Pat. Nos. 4,364,331 and 4,251,581. See also German No. 3,006,352, German No. 3,129,837, Japanese No. 3,126,953, Japanese No. 0,123,523 and Soviet Union No. 1,054,373.

Thus, the need still exists for a cushioned athletic surface which does not shrink and which has the consistent playability of asphalt or concrete courts.

Therefore, it is an object to this invention to provide an artificial athletic court surface.

It is another object of this invention to provide an athletic court surface which is not subject to excessive shrinkage.

It is another object of this invention to provide an athletic court surface which reduces the problem of moisture absorbency present in prior art surfaces.

It is a still further another object of this invention to provide an athletic court surface and a method for its production which produces a consistent athletic surface without the deficiencies of other artificial athletic surfaces.

It is a still further object of this invention to provide an athletic court surface which can be placed over existing asphalt or concrete surfaces to extend their usefulness.

These and other objects and features of the present invention become apparent to those skilled in the art from a consideration of the following detailed description, drawings and claims. The description, along with the accompanying drawings, provide a selected example of construction of the athletic court surface to illustrate the invention.

SUMMARY OF INVENTION

In accordance with the present invention there is provided a cushioned athletic surface comprising a top surface and a backing portion. The top surface is comprised of a polyester fabric into which is impregnated with an acrylic latex emulsion. Secured to this top layer by a polyurethane adhesive layer is the backing portion comprised of a balancing fabric layer onto which is secured by means of a polyurethane foam a fiberglass stabilizing layer.

This cushioned athletic surface provides a safe, consistent athletic surface for application to the base of conventional athletic surfaces such as asphalt or concrete. Because of the improvements in the materials of this athletic surface, the harmful shrinkage problems of other surfaces is prevented. In addition, the surface produces greatly improved playing conditions and greater wearability.

BRIEF DESCRIPTION OF THE DRAWINGS

The invention will now be described with reference to the accompanying drawing in which.

DETAILED DESCRIPTION OF PREFERRED EMBODIMENT

Figure 1:
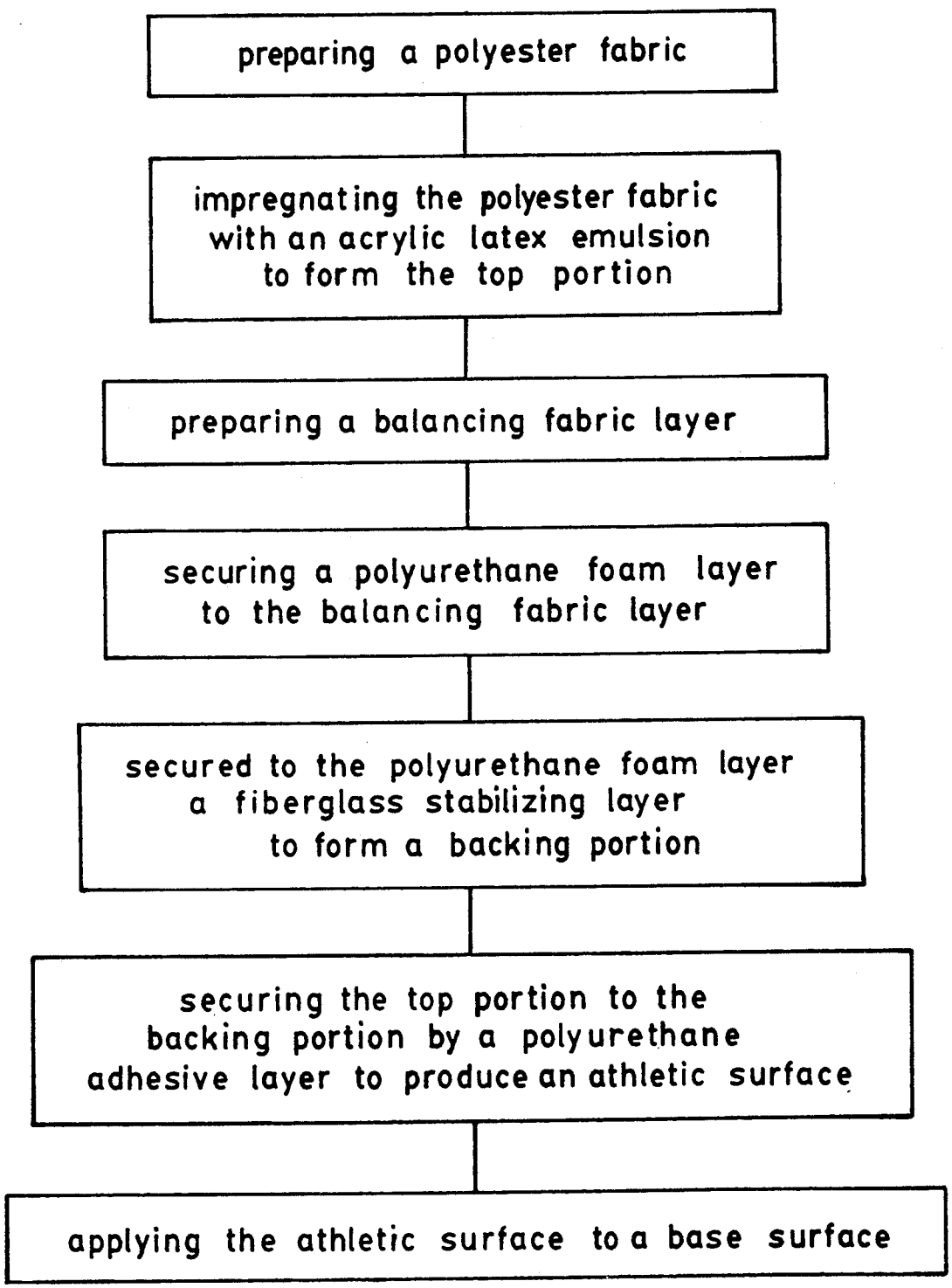
FIG. 1 is a schematic drawing of the process for preparing an athletic surface.

Although the invention is adaptable to a wide variety of uses, it is shown in the drawing and in the description for the purpose of illustration as a tennis surface.

The Prior Art Product

To fully understand this invention, it is important to understand the prior art products used by TenniSphere, Inc. In the TenniSphere product, a conventional polyethylene foam with a thickness of about ⅛" is produced. TenniSphere uses a polyethylene foam, Volara, Grade 2AW, manufactured by Voltek.

A 100% continuous filament polyester non-woven needle-punched material obtained form Hoechst Celanese (Product No. 1114) is coated with a conventional SBR (styrene butadiene rubber) latex coating. This SBR latex coated polyester material is then glued to a polyethylene foam by a conventional gluing procedure well known in the industry. At all stages after the coating and gluing process, the material is air dried prior to the next stage of production. To this finished material is added normal layers of an acrylic latex with sand or other conventional paints that might be used for any athletic surface, specifically a tennis surface.

Sheets of this finished material are generally slightly thicker than about ¼" in thickness depending upon the amount of acrylic latex and other types of coatings that are placed on top of the surface. Generally, these bonded sheets are formed into rolls of about 6' in width and are shipped to the customer for installation.

When these sheets are applied, they are rolled over the existing concrete or asphalt base. Since one of the major purposes of this type of surface is to recoat an existing surface which has developed cracks, holes or substantial valleys, these cracks, holes and valleys are filled before the material is laid over the surface. The seams between the adjacent rolls of the surface are sealed by conventional sealing procedures such as with conventional seam tape and seaming glue. After the seams are allowed to dry, the court is covered with layers of an acrylic latex mixed with silica sand, if desired, to provide a tennis surface to meet the specifications of the purchaser. Different colors, court lines, etc. can be produced by varying the materials that are placed on the surface.

Along the perimeter of the court the surface is glued to the base with no glue being applied to the central portion of the playing surface. A special securing glue such as 34N by Synthetic Surfaces, Inc. of Scotch Plains, N.J. is used which provides an effective bonding agent to bond the material to the surface of the athletic surface.

It has been determined that once this prior art surface is applied, particularly to an asphalt base, contraction and expansion causes cracking to occur in the base as soon as the ambient temperature rises above about 60° F. As the surface is bound so firmly to the base, when it contracts, it pulls the asphalt base itself thus causing cracks to appear around the outside of the playing surface. While such cracks may not appear where a concrete base is used, significant pressure is placed on the concrete surface because of the shrinking of the artificial athletic surface which frequently leads to other problems.

In a slightly improved version of this TenniSphere product, the SBR latex is heat dried on the polyester material at a temperature ranging up to about 250° F. No other change is made to the process. When this new artificial athletic surface produced by this improved procedure is utilized, cracks still appear in an asphalt base although they are somewhat reduced in size and exist around the perimeter of the surface where it is attached to the base. The amount of shrinkage is still substantial enough to cause significant problems.

The New Product

In the new product, the top surface is comprised of a polyester fabric treated with an acrylic latex emulsion. Although various types of polyester fabrics may be used, a spun bonded, non-woven polyester fabric is preferred.

The polyester fabric used in this process can be of any type readily used in the athletic surface industry and, in a preferred embodiment, is a 100% continuous filament polyester non-woven needle-punched fabric such as that manufactured by Spartan Mills, Product No. 662035. This product is produced in a sheet which is then sent through an acrylic latex bath where it is impregnated with an acrylic latex.

The acrylic latex used in this bath may be any conventional acrylic latex which provides stability to the polyester fabric and, in a preferred embodiment, the polyester fabric is impregnated before it is joined to the other elements of the surface. One preferable acrylic latex is C-9944 manufactured by Textile Rubber & Chemical Co., Inc. The acrylic latex provides stability to the polyester material. The percentage of the acrylic latex that is added to the polyester material ranges preferably from about 2% to about 20%, based on the weight of the polyester material and, most preferably, from about 3% to about 8%.

The acrylic latex is heat set into the polyester material by heating it at a temperature from about 120° C. to 200° C. and preferably from about 140° C. to about 180° C. The heat setting process preferably occurs as the polyester material is flowing through a conventional heat curing process on conventional belt processing equipment.

The top surface of the instant invention is either prepared separately and applied to the backing portion or the entire court surface can be prepared in one continuous process.

The backing portion is generally comprised of a stabilizing layer containing fiberglass which is secured to a balancing fabric layer by a polyurethane foam. The general procedures for manufacture of the backing portion are disclosed in U.S. Pat. No. 4,915,999, which patent is incorporated herein by reference.

To provide dimensional stability to the backing portion, the stabilizing layer containing non-woven fiberglass is adhered to the back face of the top surface. The fiberglass fabric layer is, for example, a 1 pound, non-woven fiberglass matting material manufactured by Manville. The upper face of the stabilizing layer is advantageously adhered to the back face of the top surface with a resilient polyurethane adhesive or, alternatively, the top layer is impregnated with a polyurethane adhesive prior to joining with the backing portion. Procedures for coating the back of the top surface with the polyurethane adhesive and bringing it into intimate contact with the fiberglass stabilizing layer are well known in the ordinary level of skill in the art. See for example, U.S. Pat. No. 4,632,850, which patent is incorporated herein by reference.

The product further comprises a balancing fabric layer which is preferably secured to the back of the fiberglass stabilizing layer by a polyurethane foam. The balancing fabric layer comprises a composite of nylon fibers and woven polypropylene fabric. The nature and proportion of the material comprising the balancing layer are selected to provide thermal and moisture absorbency characteristics, compatible with those of the top surface. As the tennis surface product is exposed to thermal extremes, expansion and contraction of the top surface may occur. This expansion and contraction is generally prevented by the fiberglass stabilizing layer, as it is virtually impervious to heat. Thus, as the top surface anneals and contracts, it may cause a tension across the upper surface of the fiberglass stabilizing layer which exerts a bending moment about the stabilizing layer. To counteract this internal stress, the balancing layer is selected to provide thermal and moisture absorbency characteristics which will create a bending moment about the fiberglass stabilizing layer to counteract the bending moment exerted by the top surface as the athletic court surface is exposed to temperature extremes or to changes in humidity. To counteract stress resulting from temperature extremes, the balancing layer of the disclosed embodiment comprises a layer of woven polypropylene fabric. The preferred balancing layer is manufactured by Amoco Fabrics, Style 3808, an 18×13 Pick, lenoweave. As the athletic court surface product is heated and the top surface deforms, the polypropylene fabric layer of the balancing layer similarly deforms. Thus, as a primary fabric backing exerts a tension on the front side of the fiberglass stabilizing layer, the balancing layer exerts an equal tension on the opposite side of the stabilizing layer.

To impart additional comfort to the surface, the polyurethane foam is used to secure the back of the fiberglass stabilizing layer to the balancing fabric layer. This polyurethane foam layer is preferably formed in the continuous manufacturing process wherein the balancing layer is secured to the fiberglass layer. The polyurethane foam layer is added by conventional procedures frequently used in the carpeting industry, such as those disclosed in U.S. Pat. No. 4,522,857. The thickness of this layer will depend on the amount of cushioning required or requested by the user of the product but preferably the fiberglass layer is from about 1/20" to about ⅛" in thickness.

Once the top surface and the bottom portion of the athletic surface are produced and glued together, the combined product is applied to the chosen base in a manner which is conventional. Preferably, it is laid out on the base surface and the interfaces of the rolls of the material are glued together with seam tape and seam glue. The edges of the material are then glued down to the base.

After the material is laid down and the seams are sealed and glued, in a preferred embodiment, at least three coatings of a high quality 100% acrylic latex tennis surface coating material are added. This surface coating material can be obtained from any conventional supplier of acrylic latex surface coating materials including Koch Materials, Inc., Sportec International, Inc. and California Products Corp. Included with this acrylic coating can be sand or other materials to provide a better feel to the surface. These surface coatings provide additional protection from U.V. deterioration, permit changes in the playability features of the surface to make it faster, slower or of medium speed, and allow the owner to color the surface in any manner that is desired.

In operation the polyester material is prepared, such as is produced by Spartan Mills, Product ID No. 662035, a 4 oz. non-woven mat. This product is produced in a sheet which is impregnated with an acrylic latex emulsion, such as that manufactured by Textile Rubber & Chemical Co., Inc., to provide stability to the polyester material. After the polyester material is impregnated with the acrylic latex, it is heat set at a temperature from about 120° C. to about 200° C.

After the top surface is produced, the backing portion is then prepared. A balancing fabric layer is secured to the back of a fiberglass stabilizing layer by a conventional, resilient polyurethane adhesive. The fiberglass stabilizing layer is then secured to the top surface by a second polyurethane adhesive. Alternatively, the polyurethane adhesive may be automatically embedded in one or both of the layers to permit the surfaces to be secured together.

This material is then laid on the selected base surface with its edges secured by seam glue and seam tape. To the upper surface of this material is applied acrylic latex coatings in at least two and as many as four layers. The coatings can be combined with small grain sand, paint and other materials to provide the texture and color for the surface with is desired. The athletic surface is finally secured in place to the base by gluing along the edges of its under surface.

I claim:

1. A cushioned athletic surface with improved shrinkage and resistance to moisture absorbency for placement on a base material comprising a top surface and a backing portion wherein the top surface is comprised of a polyester fabric impregnated with an acrylic latex emulsion and wherein the backing portion is comprised of a balancing fabric layer secured to a stabilizing layer containing fiberglass by a polyurethane foam layer wherein said backing portion is secured to the top surface by an adhesive layer.

2. The cushioned athletic surface of claim 1 wherein at least one layer of an acrylic latex coating is applied atop said athletic surface.

3. The cushioned athletic surface of claim 2 wherein a glue attaches said cushioned athletic surface to said base material at the outer edges of said cushioned athletic surface.

4. The cushioned athletic surface of claim 1 wherein the percentage of acrylic latex impregnated into the polyester material ranges from about 2% to about 20% based on the weight of the polyester material.

5. The cushioned athletic surface of claim 1 wherein the percentage of acrylic latex impregnated into the polyester material ranges from about 3% to 8% based on the weight of the polyester material.

6. The cushioned athletic surface of claim 1 wherein the acrylic latex is heat set into the polyester material by heating it to a temperature of about 120° C. to about 200° C.

7. The cushioned athletic surface of claim 1 wherein the acrylic latex is heat set into the polyester material by heating it to a temperature of about 140° C. to about 180° C.

8. The cushioned athletic surface of claim 1 wherein the adhesive is a polyurethane adhesive.

9. The cushioned athletic surface of claim 1 wherein the polyurethane adhesive is embedded in the stabilizing layer and backing portion.

* * * * *